United States Patent [19]

Takatori et al.

[11] Patent Number: 5,239,619
[45] Date of Patent: Aug. 24, 1993

[54] LEARNING METHOD FOR A DATA PROCESSING SYSTEM HAVING A MULTI-LAYER NEURAL NETWORK

[75] Inventors: Sunao Takatori; Makoto Yamamoto, both of Tokyo, Japan

[73] Assignee: Yozan, Inc., Tokyo, Japan

[21] Appl. No.: 689,338

[22] Filed: Apr. 23, 1991

[30] Foreign Application Priority Data

Apr. 24, 1990 [JP] Japan .................................. 2-106360
Apr. 24, 1990 [JP] Japan .................................. 2-106361

[51] Int. Cl.$^5$ ............................................. G06F 15/18
[52] U.S. Cl. ...................................... 395/23; 395/22; 382/10
[58] Field of Search ................................... 395/23, 22

[56] References Cited

U.S. PATENT DOCUMENTS

4,874,963 10/1989 Alspector ........................... 307/201
5,033,006 7/1991 Ishizuka et al. ..................... 364/513
5,041,916 8/1991 Yoshida et al. ..................... 358/433

OTHER PUBLICATIONS

Graf et al., "VLSI Implementation of a Neural Network Model", Computer, Mar. 1988, 41–49.
Shepanski, J. F., "Fast Learning in Artificial Neural Systems: Multilayer Perception Training Using Optimal Estimation", IEEE Intl. Conf. on Neural Networks, Jul. 1988, I-465-472.
Lippmann, R. P., "Pattern Classification Using Neural Networks", IEEE Communications Mag., Nov. 1989, pp. 47–64.
Collins, J. W., "A Neural Network Based on Co-Occurrence Probabilities", IEEE First Intl. Conf. on Neural Networks, Jun. 1987, II-487-494.
Ramacher et al., "A Geometrical Approach to Neural Network Design", Intl. Joint Conf. Neural Networks, 1989, II-147-153.
Hecht-Neilsen, "Kolmogorov's Mapping Neural Network Existence Theorem", Maureen Caudill and Charles Butler: IEEE First International Conference on Neural Networks San Diego, California, Jun. 21–24, 1987, vol. III, The Institute of Electrical and Electronics Engineers, Inc., pp. III-IIb to III-14.

Primary Examiner—Michael R. Fleming
Assistant Examiner—Robert W. Downs
Attorney, Agent, or Firm—Cushman, Darby & Cushman

[57] ABSTRACT

A learning method for a neural network having at least an input neuron layer, an output neuron layer, and a middle neuron layer between the input and output layers. Each of the layers include a plurality of neurons which are coupled to corresponding neurons in adjacent neural layers. The learning method performs a learning function on the neurons of the middle layer on the basis of the respective outputs, or "ignition patterns", of the neurons in the neural layers adjacent to the middle layer. The ignition pattern of neurons in the input layer is decided artificially according to a preferable image pattern to be input. The ignition pattern of neurons in the output layer is decided artificially according to the ignition pattern of the input layer neurons, wherein the ignition pattern of the output layer neurons is predetermined to correspond to a code or pattern preferable for a user. The ignition pattern of the middle layer neurons, coupled to the associated neurons of the respective input and output layers, is then decided according to the ignition pattern of the input layer and the output layer.

17 Claims, 3 Drawing Sheets

LEARNING METHOD FOR A DATA PROCESSING SYSTEM HAVING A MULTI-LAYER NEURAL NETWORK

BACKGROUND OF THE INVENTION

1. Field of the Invention

The present invention is related to data processing systems using neural network models in computer architecture systems.

2. Description of the Related Art

Computer architecture systems have been developed recently which use a parallel processing scheme known as neural networks.

A neural network to be used in a data processing system is constructed in a multi-layer state by placing in parallel a neural cell such as the neural cell model 10 shown in FIG. 1 ("neuron", hereinafter). The neuron in each layer is connected by synapses to all the neurons in an adjacent layer, and the neuron inputs and outputs data. Referring to neuron 10 FIG. 1, weights W1, W2, W3, ..., Wn are multiplied to data I1, I2, I3, ..., In which are externally input. Data O, which corresponds to the comparison between the sum of the multiplication and threshold Θ, is output from the neuron 10.

Various methods are possible for the comparison operation of the neuron 10. When the normalized function 1 [f] is adopted, output data O is expressed as shown in formula (1).

$$O = 1[\Sigma Wn \cdot In - \Theta] \quad (1)$$

When $\Sigma = Wn \cdot In$ is more than or equal to threshold Θ, the neuron ignites and the output data O is "1"; when Wn·In is less than threshold Θ, the neuron does not ignite and the output data O is "0".

Conventional neural networks form a neural layer by placing such neurons in parallel and by connecting the neural layers in series. A neural layer is comprised of, for example, three layers of an input layer, middle layer and output layer as Perceptrons: as suggested by Rosenblatt, the neuron in each layer combines with all neurons in the adjacent layers by synapses.

In such a data processing system, the operation of adapting the weight of the synapse of each neuron is called "learning". Since it is important when performing the learning operation to guarantee its realization and to perform it efficiently, problems associated with these factors may rise. For example, in back-propagation methods of learning which have attracted attention in previous years, problems exist in obtaining a local minimum and a small convergence time. These problems are magnified because the tendency is strong in neural networks to include a large number of middle layers.

SUMMARY OF THE INVENTION

The present invention solves the above problems of the prior art and has an object to provide a learning method with the ability to execute efficient learning for a neural network.

Specifically, the present invention provides a novel learning method for a neural network having at least an input neuron layer, an output neuron layer, and a middle neuron layer between the input and output layers. Each of the layers include a plurality of neurons which are coupled to corresponding neurons in adjacent neural layers.

The learning method of the present invention performs a learning function on the neurons of the middle layer on the basis of the respective outputs, or "ignition patterns", of the neurons in the neural layers adjacent to the middle layer. Specifically, the learning method according to the present invention works as follows: the ignition pattern of neurons in an input layer is decided artificially (e.g., decided on the basis of a predetermined or desired response to the corresponding inputs), according to a preferable image pattern to be input, such as a code or alphanumeric characters. The ignition pattern of neurons in an output layer is decided artificially according to the ignition pattern of the input layer neurons, wherein the ignition pattern of the output layer neurons is predetermined to correspond to a code or pattern preferable for a user. The ignition pattern of the middle layer neurons, coupled to the associated neurons of the respective input and output layers, is then decided according to the ignition pattern of the input layer and the output layer.

According to a first embodiment of the present invention, the step of determining the ignition pattern of the middle layer is performed by determining if the corresponding neurons in the input layer and output layer ignite more than a predetermined rate: if these corresponding neurons do ignite at more than a predetermined rate, the associated neuron in the middle layer is deemed to have a tendency to ignite in response to the corresponding input layer ignition pattern, and thus the weight of the middle layer neuron is adjusted accordingly.

According to a second embodiment of the present invention, the step of determining the ignition pattern of the middle layer is performed by determining if the output values in corresponding areas in the input layer, when summed with a corresponding output value in the output layer multiplied by a predetermined coefficient, is more than a predetermined value: if the summation is more than the predetermined value, then the associated neuron in the middle layer is deemed to have a tendency to ignite in response to the corresponding input layer ignition pattern, and thus the weight of the middle layer neuron is adjusted accordingly.

The above learning process is repeated in order that the neural network can learn to respond to the representative data to be processed. In addition, the learning process for all the representative data may be repeated so that the neurons of the neural network have a large increase in weight during the beginning of the learning operation, with finer adjustments in the weights of the neurons made in later learning steps.

The learning process of the present invention is also advantageous in the case where a large number of middle layers are desired in the neural network: in this case, the number of middle layers can be increased sequentially. Specifically, a new middle layer can be added when the learning in a first middle layer is completed and then the same learning process is executed on the new middle layer. Since the number of neurons in the input and output layers is decided by data capacity of a neural layer, the amount of data processed is decided by the number of neurons in whole neural network. Therefore, the present invention is able to add middle layers to process larger amounts of data.

DETAILED DESCRIPTION OF THE PREFERRED EMBODIMENTS

Hereinafter, the present invention is explained with reference to the accompanying drawings.

Figure 2:
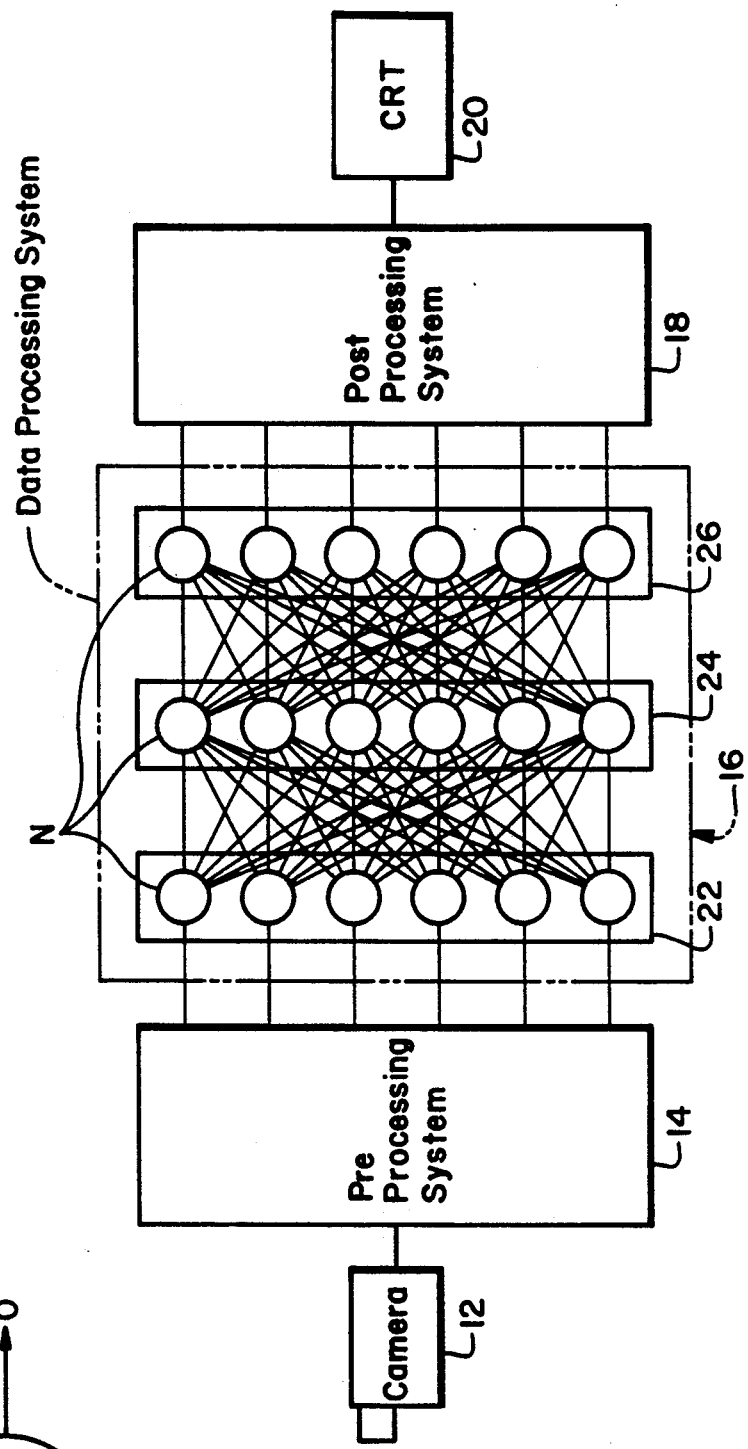
FIG. 2 shows an exemplary structure of a character recognition system utilizing a neural network of the present invention.

FIG. 2 shows a character recognition system having a data processing system implementing a neural network of the present invention. The character recognition system comprises a video camera 12, a pre-processing system 14, data processing system 16, post-processing system 18 and a display 20. The video camera 12 is set to input image patterns, such as alphanumeric characters to the pre-processing system 14. Pre-processing system 14 is, for example, a well-known image processing system which extracts the characteristics of input characters (e.g., the number of edge points or branch points) and outputs the data to the data processing system 16. The data processing system 16, which includes a neural network as described later, recognizes an alphanumeric character based on the characteristics data input from the pre-processing system 14, and outputs the data according to the recognition result to the post-processing system 18. The recognition result data may be in the form of character codes, for instance. The post-processing system 18 stores the output data as, for example, word processor data and simultaneously outputs the data to display 20. Display 20 includes a CRT and indicates the characters recognized by the data processing system 16 on the display.

The neural network of the data processing system 16 is constructed as a part of hardware of a computer. Data processing system 16 is shown in FIG. 2 as a model comprising input layer 22, middle layer 24, and output layer 26, whereby middle layer 24 is positioned between input layer 22 and output layer 26. In the present embodiment, each layer 22, 24, and 26 comprises N number of neurons, whereby all the neurons "N"s in input layer 22 are connected to all the neurons of N in middle layer 24, and those in middle layer 24 are connected to all the neurons of N in output layer 26.

As mentioned above with reference to FIG. 1, each neuron N outputs the data of "1" or "0" according to the normalized function in formula (1). Neuron N is constructed of, for example, an operational amplifier. Weight Wn to be multiplied to the data input to each neuron N is obtained by a changeable or variable resistor connected to the input terminal of the neuron. The threshold function $\Theta$ is realized by a switching element. Thus, learning is executed by amending output data and changing the weight Wn by changing the changeable resistor according to output data of each neuron.

Figure 3A:
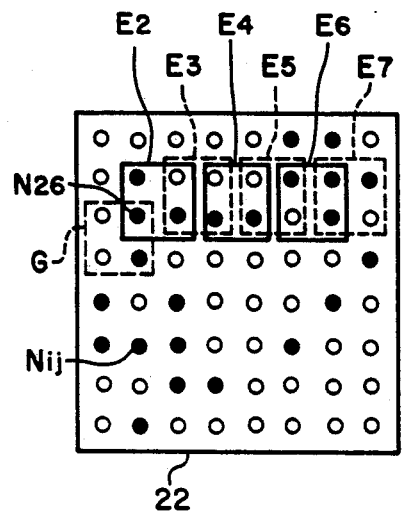
FIGS. 3(a), 3(b) and 3(c) show the outline structure of a neuron in an input layer, middle layer and an output layer, respectively of a neural network according to a first embodiment of the present invention.
Figure 3B:
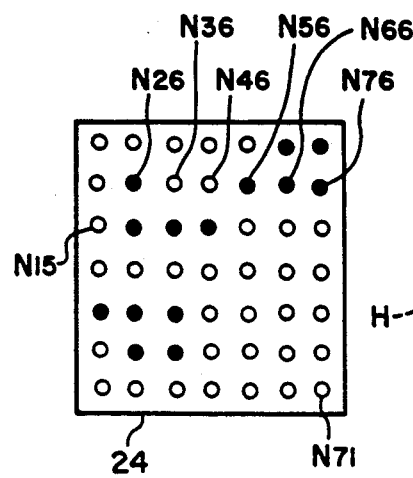
Figure 3C:
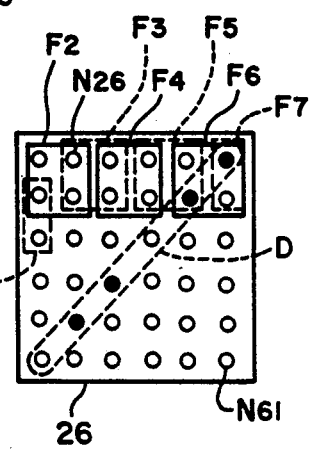

FIGS. 3(a), 3(b) and 3(c) show input layer 22, middle layer 24 and output layer 26 as a model, respectively of a neural network according to a first embodiment of the present invention. The input layer 22 possesses the most neurons and output layer 26 possesses the least neurons. Here, for a simple explanation, it is assumed that the number of neurons in input layer 22 is 64, the number in middle layer 24 is 49, and the number in output layer 26 is 36: neurons are arranged in $8 \times 8$ lateral and longitudinal directions (e.g., rows and columns) in the input layer 22, $7 \times 7$ in middle layer 24, and $6 \times 6$ in output layer 26, respectively. Here, the neuron at the lower left-hand position is referred to as the origin, and the neuron in the location of i-th column and j-th row is referred to as Nij.

Each neuron in the input layer 22 ignites by characteristics data obtained through the video camera 12. For example, when ignition combination of N11, N12, N21 and N22 expresses the number of edge points, and N13, N14, N23 and N24 expresses the number of branch point, the ignition pattern of neurons in input layer 22 is decided artificially according to image patterns, such as alphanumeric characters to be input.

On the other hand in output layer 26, a character is expressed by neuron Nii on a diagonal line from the edge on lower left to the edge on upper right (e.g., the neurons surrounded by broken line "D" in FIG. 3(c)). That is, the neurons on the diagonal line D express the character code of the character, and the ignition pattern of neuron in output layer 26 is decided artificially. In the present embodiment, there are sixty-four (64) available ignition patterns for neuron Nii on diagonal line D. Therefore, it is possible to recognize 64 kinds of alphanumeric characters, so that recognition of alphabets is possible, for example.

Before executing learning of character recognition, neurons in output layer 26 do not ignite even if the character data is input to the data processing system 16. These neurons however can ignite by learning, which is concluded when a predetermined ignition pattern has appeared according to input character data. The input and output pattern for learning is determined by the representative data to be processed in the neural network.

The data to be actually processed will be much more varied, and hence the representative data makes up only a subset of the data actually processed by the neural network. Learning is executed until association for the representative input and output data is performed adequately. When learning is concluded, input layer 22 and output layer 26 show an ignition pattern decided artificially according to input character data as mentioned above.

For efficient processing, the ignition patterns of input layer 22 and output layer 26 should be decided artificially such that the ignition pattern in each layer of input layer 22, middle layer 24 and output layer 26 changes gradually, or smoothly. In other words, in the present embodiment, the weights in middle layer 24 and output layer 26 are changed so that the ignition pattern in these layers changes smoothly during the learning process, thereby providing even distribution of data processing throughout the neural network.

The learning process according to the first embodiment of the present invention will now be described. First, it is decided if neuron Nij in middle layer 24 ignites or not by analyzing the ignition of plural neurons in input layer 22 and the corresponding neurons in the output layer 26. According to the first embodiment, when corresponding plural neurons in input layer 22 and output layer 26 ignite at more than a predetermined rate, neuron Nij in middle layer 24 is judged to have the tendency of ignition. As a result, weights of designated neurons in middle layer 24 and output layer 26 are increased in order to obtain such ignition.

The judging method if neurons in middle layer 24 are to ignite or not according to the first embodiment will be more clearly understood with reference to FIGS. 3(a), (b) and (c). FIG. 3(a) shows an exemplary ignition pattern in input layer 22, FIG. 3(b) shows an exemplary ignition pattern in middle layer 24, and FIG. 3(c) shows an exemplary ignition pattern in output layer 26. In these figures, black circles indicate ignited neurons, and white circles show unignited neurons. In this embodiment, input layer 22 in FIG. 3(a) shows the ignition pattern according to characteristics data of an input character and the output layer 26 in FIG. 3(c) shows the required ignition pattern for recognition of the input character. That is, the ignition pattern in input layer 22 in the diagram is fixed according to input character and the ignition pattern in output layer 26 is the pattern which occurs upon the completion of learning. The ignition pattern in middle layer 24 is decided according to the ignition pattern of input layer 22 and output layer 26.

The relationship among neurons in each layer, according to the first embodiment, is described below. For each neuron in middle layer 24, there are four neurons in input layer 22 and output layer 26 which correspond in principle to the middle layer neuron. That is to say, the neurons corresponding to neuron Nij in middle layer 24 are neurons Nij, N(i+1)j, Ni(j+1), N(i+1)(j+1) in input layer 21 (e.g., the area surrounded by "E2" in input layer 22 for neuron N26 in middle layer 24), and N(i−1)(j−1), Ni(j−1), N(i−1),j, Nij in output layer 26 (e.g., the area surrounded by "F2" in output layer 26 for neuron N26 in middle layer 24). The neurons corresponding to each neuron N11, N71, N17, and N77 at the corners of middle layer 24 are the four neurons in input layer 22 as described above; however, the neurons in the output layer 26 corresponding to these neurons at the corner of the middle layer 24 are neurons N11, N61, N16 and N66, respectively. The neurons corresponding to each neuron Ni1, Ni7, N1j, N7j on the periphery of middle layer 22 are the four neurons in input layer 22 similarly to the mapping described above, however, the corresponding neurons in the output layer 26 are neurons N(i−1)1 and Ni1 for neuron Ni1 of the middle layer 24, N(i−1)6 and Ni6 for neuron Ni7 of the middle layer 24, N1(j−1) and N1j for neuron N1j of the middle layer 24, and N6(j−1) and N6j for neuron N7j of the middle layer 24.

Neurons in middle layer 24 are judged to have the tendency to ignite when, for example, more than 35% of the plural neurons in input layer 22 and output layer 26 corresponding to the middle layer neurons ignite. In the example of FIG. 3, three neurons ignite among the neurons in input layer 22 and output layer 26 corresponding to neuron N26 in middle layer 24 (e.g., the eight neurons in area E2 and F2). Therefore, N26 in middle layer 24 is judged to be in the tendency to ignite. Two neurons ignite among neurons in input layer 22 and output layer 26 corresponding to neuron N15 in middle layer 26 (e.g., six neurons in area G and H), so that neuron N15 in middle layer 24 has a tendency not to ignite. Neurons in middle layer 24 which are judged to have the tendency to ignite are shown in the ignition pattern in FIG. 3(b).

Figure 4A:
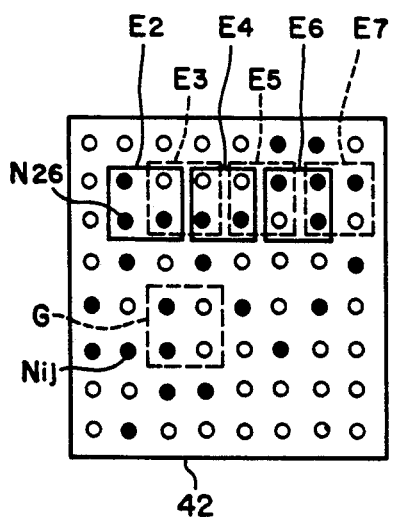
FIGS. 4(a), 4(b) and 4(c) show the outline structure of a neuron in an input layer, middle layer and output layer, respectively of a neural network according to a second embodiment of the present invention.
Figure 4B:
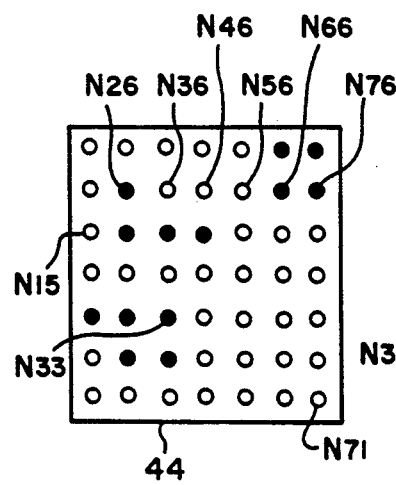
Figure 4C:
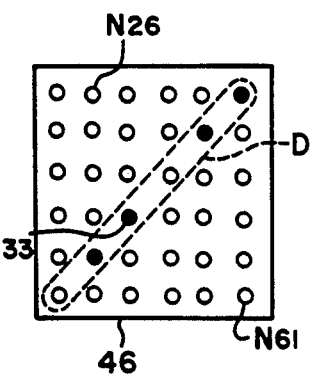

FIGS. 4(a), 4(b) and 4(c) show input layer 42, middle layer 44 and output layer 46 as a model, respectively, according to a second embodiment of the present invention. As described in the first embodiment, the input layer 42 possesses the most neurons and the output layer 46 possesses the least neurons. The second embodiment is substantially similar to the first embodiment, and hence the apparent similarities will not be described, but rather the differences between the first and second embodiments will now be described.

As described above, the first step of the learning process of the middle layer 44 is determining if neuron Nij in the middle layer 44 ignites or not by analyzing the ignition of plural neurons in input layer 42 and the corresponding neurons in output layer 46. In this second embodiment, the output values in corresponding areas in the input layer 42 are summed with the corresponding output value of the output layer 46 which has been multiplied by a predetermined coefficient; if the summation of output values is more than a predetermined value, neuron Nij in the middle layer 44 is judged to have the tendency of ignition. As a result, the weights of the designated neurons in the middle layer 44 and the output layer 46 are increased in order to obtain such ignition.

The predetermined coefficient is multiplied to the output value of the corresponding neuron in the output layer 46 so that there is an equal influence on the corresponding neuron in middle layer 44 with respect to the corresponding neurons in input layer 42. For example, for a given neuron in the middle layer 44, if there are four corresponding neurons in the input layer 42 and one corresponding neuron in the output layer 46, then the predetermined coefficient PC=4 is multiplied to the output value in the output layer 46. As a result, each corresponding neuron in the input layer 42 and the output layer 46 has equal influence on the ignition distribution of the neurons of the middle layer 32.

As shown in FIGS. 4(a), 4(b) and 4(c), the relationship between neurons in each layer according to the second embodiment is such that each neuron in middle layer 44 has four corresponding neurons in the input layer 42 and one neuron in the output layer 46. That is, the neurons corresponding to neurons Nij in the middle layer 44 are neurons Nij, N(i+1)j, Ni(j+1) and N(i+1)(j+1) in the input layer 42 (e.g., the area surrounded by area "E2" in input layer 42 for neuron N26 in the middle layer 44) and neuron Nij in the output layer 46 (e.g., neuron N26 in output layer 46 for neuron N26 in middle layer 44). According to the second embodiment, the neurons corresponding to neuron Ni7 (on the upper edge) and neuron N7i (on the right edge) of the middle layer 32 in FIG. 4(b) are neuron Ni6 (on the upper edge) and neuron N6j (on the right edge) of the output layer 46, respectively.

Neurons in the middle layer 44 are judged to have the tendency to ignite when, for example, the values in corresponding areas in input layer 42 when summed with the corresponding value of the output layer, multiplied by a predetermined coefficient, have a value equal to or more than a predetermined value of "3". In the second embodiment, an output value is "1" if a neuron ignites and "0" if the neuron does not ignite. Referring to neuron N26 in middle layer 42, the total output value from the four neurons in the corresponding area E2 in the input layer 42 is "3"; further, the output value from the corresponding neuron N26 in the output layer 46 is "0". Thus, the summation of the input and output neurons is "3", and therefore the neuron N26 in the middle layer 44 is judged to have the tendency to ignite.

On the other hand, referring to neuron N33 in the middle layer 44, the total output value from the neurons in the corresponding area G in the input layer 42 is "2"; the output value from the corresponding neuron N33 in the output layer 46 is "1". Thus, the output values from the input layer 42, in this case "2", is summed with the output value "1" from the output layer 42 after being multiplied by the predetermined coefficient "4", so that the total summation is "2+(1×4)=6". Therefore, since the total summation "6" is greater than the predetermined value "3", the neuron N33 of the middle layer 44 is judged to have the tendency to ignite.

The learning of character recognition according to the present invention, e.g., obtaining the desired ignition pattern, is achieved by increasing the predetermined value of the weight of each neuron in the middle layer and the output layer.

Figure 1:
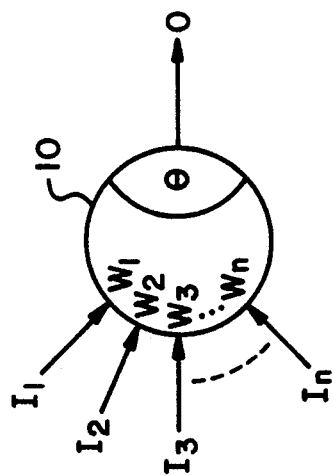
FIG. 1 shows the outline structure of an embodiment of a conventional neuron.

The increase of weight is described with reference to the neuron in FIG. 1. When output data O of a neuron 10 in the middle layer is ignited (for instance "1"), the weight of the synopses (assume "W2" and "W3" in this case) corresponding to the data input from ignited neurons (for instance "I2" and "I3") is, for example, increased 5% among the neurons in the input layer connected to neuron 10. The synapse weight of a neuron in the output layer is processed in the same way: as described above, the weight of a synapse corresponding to the neuron in middle layer decided to be ignited is increased 5%, for example.

The weight of the middle layer and the output layer according to the present invention is increased in order for the respective ignition patterns to be changed smoothly among each layer of the input layer, the middle layer and the output layer. By deciding that each neuron in the input layer and the output layer should ignite at generally the same frequency as much as possible for all input characters, it is possible for each neuron in the middle layer to ignite evenly. Thus, it is possible to prevent any neuron in the middle layer from having local minimum of ignition, so that each neuron in the middle layer ignites evenly in approximation. As a result, it is possible to avoid the generation of neurons with no ignition and to utilize neurons in the middle layer efficiently.

Figure 5:
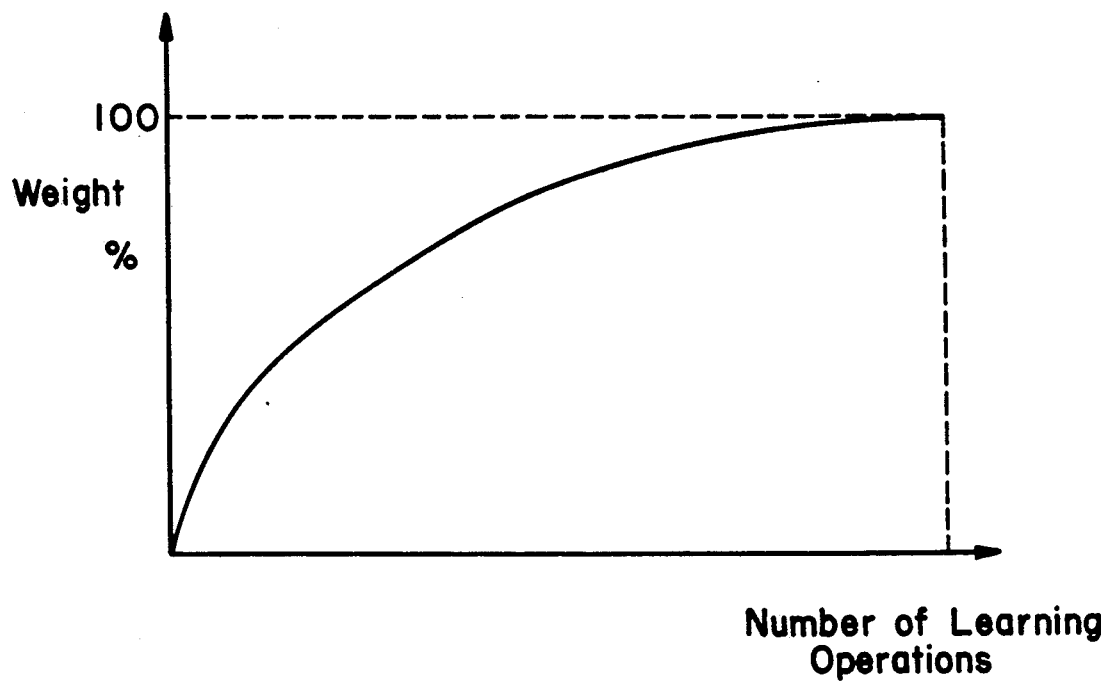
FIG. 5 shows the relationship between the number of learning operations and weight in the neural network learning process of the present invention.

As shown in FIG. 5, the increase of synapse weight during a single learning operation changes according to the number of learning operations performed. The learning of a whole system is executed gradually by plural learning operations, and, simultaneously, fine adjustments in synapse weights are carried out for fine changes by subsequent learning operations. The learning speed can be improved by rapid increase in weight in the beginning of the learning operation.

In the embodiments above, the neural network includes three neural layers, namely the middle layer, the input layer and the output layer, as shown in FIGS. 3(a)-(c) and 4(a)-(c). However, the present invention is not limited to the three layers of neural networks of the present embodiment; it is possible to apply it to neural networks with more than four layers.

In the case of four layers, the neural network includes an input layer, an output layer, a first middle layer coupled to the input layer and a second middle layer coupled to the first middle layer and the output layer. The process includes first selecting the first middle layer, and then increasing the weight of synapse in the first middle layer and the output layer in order that each neuron in the first middle layer has the tendency of ignition when the corresponding plural neurons in the input layer and the output layer each ignite with more than a predetermined rate. When learning is completed so far as a predetermined step concerning all the input characters, the second middle layer is then added, whereby the weight of each synapse is increased in the second middle layer and the layer connected to its output side, in this case the output layer, on the basis of whether corresponding plural neurons in the second neural layer have a tendency to ignite by more than a predetermined rate as shown above using the first or second embodiment. Consequently, weight distribution in the case with four layers can be obtained. As to the case with more than five layers, the same process is performed.

It should be noted that the above procedure may be modified such that after the first middle layer has completed the learning step, the second middle layer is inserted between the input layer and the first middle layer, whereby the weight of each synapse is thereafter increased in the second middle layer and the first middle layer.

As shown in FIGS. 3(a), (b) and (c), respective four neurons in input layer 22 and output layer 26 are corresponding to one neuron in middle layer 24. The number of corresponding neurons is not necessarily limited and thus any number can be selected as needed. For example, it is possible to assign nine neurons in input layer 22 and output layer 26 to correspond to one neuron in middle layer 24.

Here, areas of mapping E2 to E7 in input layer 22 correspond respectively to neurons N26, N36, N46, N56, N66 and N76. In input layer 22, the neuron in each area is included with duplication of adjacent area in right and left, and in up and down. Accordingly, each neuron in input layer 22 belongs to four areas of mapping except the neurons at the edge of the input layer 22, which correspond to four neurons in middle layer 24.

On the other hand, in the first embodiment, neuron Nij in middle layer 24 corresponds to four neurons in output layer 26, except for the neurons Ni7 and N7i on the upper and right edge of middle layer 24, respectively. That is, areas from F2 to F6 in output layer 26 correspond to neurons N26, N36, N46, N56, N66 and N76 in middle layer 24. In output layer 26, the neuron in each area is included with duplication of adjacent area in right and left, and in up and down. Accordingly, except for the edge neurons, each neuron in output layer 26 belongs to four areas and corresponds to four neurons in middle layer 24.

In this way, each neuron in middle layer 24 corresponds to plural neurons in input layer 22 and output layer 26. Each neuron in input layer 22 and output layer 26 corresponds to plural neurons in middle layer 24. That is, the adjacent neuron in input layer 22 and output layer 26 also corresponds to the same neuron in middle layer 24. Therefore, the adjacent neuron in input layer 22 and output layer 26 participates in the judgment of tendency to ignite of the same neuron in middle layer 24.

In the scond embodiment, the relationship between the middle layer 44 and the output layer 46 is such that there is a one-to-one correspondence for neuron Nij, except for neuron Ni7 on the upper edge and neuron N7i on the right edge of middle layer 44. Neuron Ni7 and N7i of the middle layer 44 are mapped onto neuron Ni6 and N6i of the output layer 46, respectively. Thus, each neuron of the middle layer 44 corresponds to one neuron in the output layer 46. As a result, both adjacent neurons in the input layer 42 and the corresponding neuron of the output layer 46 participate in the judgement of the tendency of the corresponding neuron of the middle layer 44 to ignite.

The input and output data for a neuron is not limited to being binary (i.e., "1" or "0"); but, multi-valued and analog data when the data is digital.

An output layer may be constructed to define a character for recognition by all neurons, and thus it is not necessary that express character codes be constructed by neurons on the diagonal line of the output layer.

The number of neurons in the neuron layers are not set a limit to 36: it is possible to vary the numbers of neurons according to the number of kinds of characters to be recognized.

The present invention can be applied to not only alphanumeric character recognition but also pattern recognition and voice recognition.

As mentioned above, it is possible to execute effective learning on the middle layer of a neural network by the present invention.

While this invention has been described in connection with what is presently considered to be the most practical and preferred embodiments, it is to be understood that the invention is not limited to the disclosed embodiments, but, on the contrary, is intended to cover various modifications and equivalent arrangements included within the spirit and scope of the appended claims.

What is claimed is:

1. A method for training a data processing system to correctly initiate a course of action based on digital signals supplied by a monitoring system of an environment, the method comprising the steps of:
   (a) selecting for an input neural layer, a first ignition pattern representative of digital signals supplied by said monitoring system, said input neural layer being part of a neural network in said data processing system, said neural network further including a middle neural layer and an output neural layer, said input neural layer having neurons connected to neurons of said middle neural layer and said neurons of said middle neural layer being connected to neurons of said output neural layer;
   (b) selecting for said output neural layer, a second ignition pattern representative of output for initiating a course of action in accordance with said first ignition pattern;
   (c) determining a third ignition pattern for said middle neural layer according to said first ignition pattern and said second ignition pattern so that a correct course of action will be initiated in response to digital signals input from said monitoring system, said middle neural layer being disposed to be responsive to said input neural layer and so that said output neural layer is responsive to said middle neural layer, wherein said determining step comprises for each neuron in said middle layer the steps of, (i) determining whether a set of neurons from said input and output neural layers corresponding to a neuron of said middle neural layer ignite at more than a predetermined rate, a set of corresponding neurons differing for each neuron of said middle layer; and
   (ii) increasing a weight of the neuron of said middle neural layer and neurons of said output neural layer in said set of corresponding neurons when said determining step (i) determines that said set of corresponding neurons ignite at more than a predetermined rate.

2. A method as recited in claim 1, further comprising the step of:
   (d) repeating said steps (a), (b) and (c) for each of a plurality of data patterns to be processed, said plurality of data patterns being a representative sample of data to be processed by said data processing system.

3. A method as recited in claim 1, further comprising the steps of:
   inserting another middle neural layer between said input neural layer and said middle neural layer after completing said step (c), said another middle neural layer being disposed to be responsive to said input neural layer and so that said middle neural layer is responsive to said another middle neural layer, said neurons of said input neural layer being connected to neurons of said another middle neural layer and said neurons of said another middle neural layer being connected to said neurons of said middle neural layer; and
   repeating said steps (a) to (c) for said another middle neural layer, said second ignition pattern being selected for said middle neural layer.

4. A method as recited in claim 1, further comprising the steps of:
   inserting another middle neural layer between said middle neural layer and said output neural layer after completing said step (c), said another middle neural layer being disposed to be responsive to said middle neural layer and so that said output neural layer is responsive to said another middle neural layer, said neurons of said middle neural layer being connected to neurons of said another middle neural layer and said neurons of said another middle neural layer being connected to said neurons of said output neural layer; and
   repeating said steps (a) to (c) for said another middle neural layer, said second ignition pattern being selected for said middle neural layer.

5. A method as recited in claim 1, wherein said selecting steps (a) and (b) select said first and second ignition patterns to have an even distribution of neurons in each of said input, middle and output neural layers firing.

6. A method as in claim 1, wherein said monitoring system comprises a video camera.

7. A method as in claim 1, wherein said neurons of input, middle and output layers are operational amplifiers.

8. A method as in claim 1, wherein the weight of said selected neuron of said middle neural layer and said corresponding neurons of said output neural layer are increased by altering resistance of variable resistors corresponding to said selected neuron of said middle neural layer and said corresponding neurons of said output neural layer.

9. A learning method as recited in claim 1, wherein step (i) includes the step of determining a predetermined number of neurons from said input and output neural layers having a spatial relationship to the neuron of said middle neural layer as said set of corresponding neurons, and said predetermined number is less than a total number of neurons in said input neural layer and is less than a total number of neurons in said output neural layer.

10. A method for training a data processing system to correctly initiate a course of action based on digital signals supplied by a monitoring system of an environment, the method comprising the steps of:
(a) selecting for an input neural layer, a first ignition pattern representative of digital signals supplied by said monitoring system, said input neural layer being part of a neural network in said data processing system, said neural network further including a middle neural layer and an output neural layer, said input neural layer having neurons connected to neurons of said middle neural layer and said neurons of said middle neural layer being connected to neurons of said output neural layer;
(b) selecting for said output neural layer, a second ignition pattern representative of output for initiating a course of action in accordance with said first ignition pattern;
(c) determining a third ignition pattern for said middle neural layer according to said first ignition pattern and said second ignition pattern so that a correct course of action will be initiated in response to digital signals input from said monitoring system, said middle neural layer being disposed to be responsive to said input neural layer and so that said output neural layer is responsive to said middle neural layer, wherein said determining step comprises the steps of:
(i) selecting a selected neuron of said middle neural layer;
(ii) adding output values from neurons from said input neural layer corresponding to said selected neuron of said middle neural layer to a weighted output value from a neuron from said output neural layer corresponding to said selected neuron to obtain an addition result;
(iii) increasing a weight of said selected neuron of said middle neural layer and said corresponding neuron of said output neural layer when said addition result from said adding step (ii) exceeds a predetermined value; and
(iv) selecting another neuron from said middle neural layer and repeating said steps (i) to (iii).

11. A method as recited in claim 10, further comprising the step of:
(d) repeating said steps (a), (b) and (c) for each of a plurality of data patterns to be processed, said plurality of data patterns being a representative sample of data to be processed by said data processing system.

12. A method as recited in claim 10, further comprising the steps of:
inserting another middle neural layer between said input neural layer and said middle neural layer after completing said step (c), said another middle neural layer being disposed to be responsive to said input neural layer and so that said middle neural layer is responsive to said another middle neural layer, said neurons of said input neural layer being connected to neurons of said another middle neural layer and said neurons of said another middle neural layer being connected to said neurons of said middle neural layer; and
repeating said steps (a) to (c) for said another middle neural layer, said second ignition pattern being selected for said middle neural layer.

13. A method as recited in claim 10, further comprising the steps of:
inserting another middle neural layer between said middle neural layer and said output neural layer after completing said step (c), said another middle neural layer being disposed to be responsive to said middle neural layer and so that said output neural layer is response to said another middle neural layer, said neurons of said middle neural layer beint connected to neurons of said another middle neural layer and said neurons of said another middle neural layer being connected to said neurons of said output neural layer; and
repeating said steps (a) to (c) for said another middle neural layer, said second ignition pattern being selected for said middle neural layer.

14. A method as recited in claim 10, wherein said selecting steps (a) and (b) select said first and second ignition patterns to have an even distribution of neurons in each of said input, middle and output neural layers firing.

15. A method as in claim 10, wherein said monitoring system comprises a video camera.

16. A method as in claim 10, wherein said neurons of input, middle and output layers are operational amplifiers.

17. A method as in claim 10, wherein the weight of said selected neuron of said middle neural layer and said corresponding neurons of said output neural layer are increased by altering resistances of variable resistors corresponding to said selected neuron of said middle neural layer and said corresponding neurons of said output neural layer.

* * * * *